US009103694B2

(12) United States Patent
Ozturk

(10) Patent No.: US 9,103,694 B2
(45) Date of Patent: Aug. 11, 2015

(54) METHOD AND APPARATUS FOR CONDITIONAL DRIVING GUIDANCE

(71) Applicant: HERE Global B.V., Veldhoven (NL)

(72) Inventor: Yusuf Ozturk, Veldhoven (NL)

(73) Assignee: HERE GLOBAL B.V., Veldhoven (NL)

( * ) Notice: Subject to any disclaimer, the term of this patent is extended or adjusted under 35 U.S.C. 154(b) by 0 days.

(21) Appl. No.: 13/925,280

(22) Filed: Jun. 24, 2013

(65) Prior Publication Data
US 2014/0379249 A1 Dec. 25, 2014

(51) Int. Cl.
G01C 21/12 (2006.01)
G06Q 10/00 (2012.01)
G01C 21/36 (2006.01)

(52) U.S. Cl.
CPC ........ G01C 21/3697 (2013.01); G01C 21/3632 (2013.01)

(58) Field of Classification Search
USPC .................................................. 701/408–541
See application file for complete search history.

(56) References Cited

U.S. PATENT DOCUMENTS

| 7,107,147 | B2 * | 9/2006 | Pascual et al. ................. 701/538 |
| 7,403,853 | B1 * | 7/2008 | Janky et al. ................... 701/472 |
| 8,269,652 | B2 | 9/2012 | Seder et al. |
| 8,412,449 | B2 * | 4/2013 | Trepagnier et al. ........... 701/301 |
| 2002/0146667 | A1 * | 10/2002 | Dowdell et al. ................. 434/62 |
| 2004/0102898 | A1 * | 5/2004 | Yokota et al. ................. 701/210 |
| 2008/0215238 | A1 * | 9/2008 | Geelen et al. ................. 701/210 |
| 2008/0215390 | A1 * | 9/2008 | Gipps et al. ....................... 705/7 |
| 2008/0243378 | A1 | 10/2008 | Zavoli |
| 2009/0216431 | A1 * | 8/2009 | Vu et al. ........................ 701/201 |
| 2010/0037072 | A1 * | 2/2010 | Nejah ............................. 713/310 |
| 2010/0312475 | A1 * | 12/2010 | Cheng ............................ 701/213 |
| 2011/0210867 | A1 | 9/2011 | Benedikt |
| 2012/0169514 | A1 * | 7/2012 | Imanaga et al. ............... 340/905 |
| 2013/0073204 | A1 * | 3/2013 | Vu et al. ........................ 701/533 |

OTHER PUBLICATIONS

University of Michigan Transportation Research Institute, "Interim Report on Road Departure Crash Warning Subsystems," Sep. 5, 2003, pp. 1-56.
J. Misener et al., "Cooperative Collision Warning: Enabling Crash Avoidance with Wireless Technology," 12th World Congress on ITS, Nov. 6-10, 2005, pp. 1-11.

* cited by examiner

Primary Examiner — Thomas G Black
Assistant Examiner — Tyler Paige
(74) Attorney, Agent, or Firm — Ditthavong & Steiner, P.C.

(57) ABSTRACT

An approach is provided for presenting guidance information to a driver of a vehicle in terms of safety and legality based on the vehicle's current position, direction, and speed and/or the driver's current behavior. A feasibility platform processes and/or facilitates a processing of contextual data associated with at least one vehicle to determine feasibility information associated with performing at least one maneuver using the vehicle. The feasibility platform also determines one or more user interface elements for presenting guidance information for the at least one maneuver based, at least in part, on the feasibility information.

20 Claims, 10 Drawing Sheets

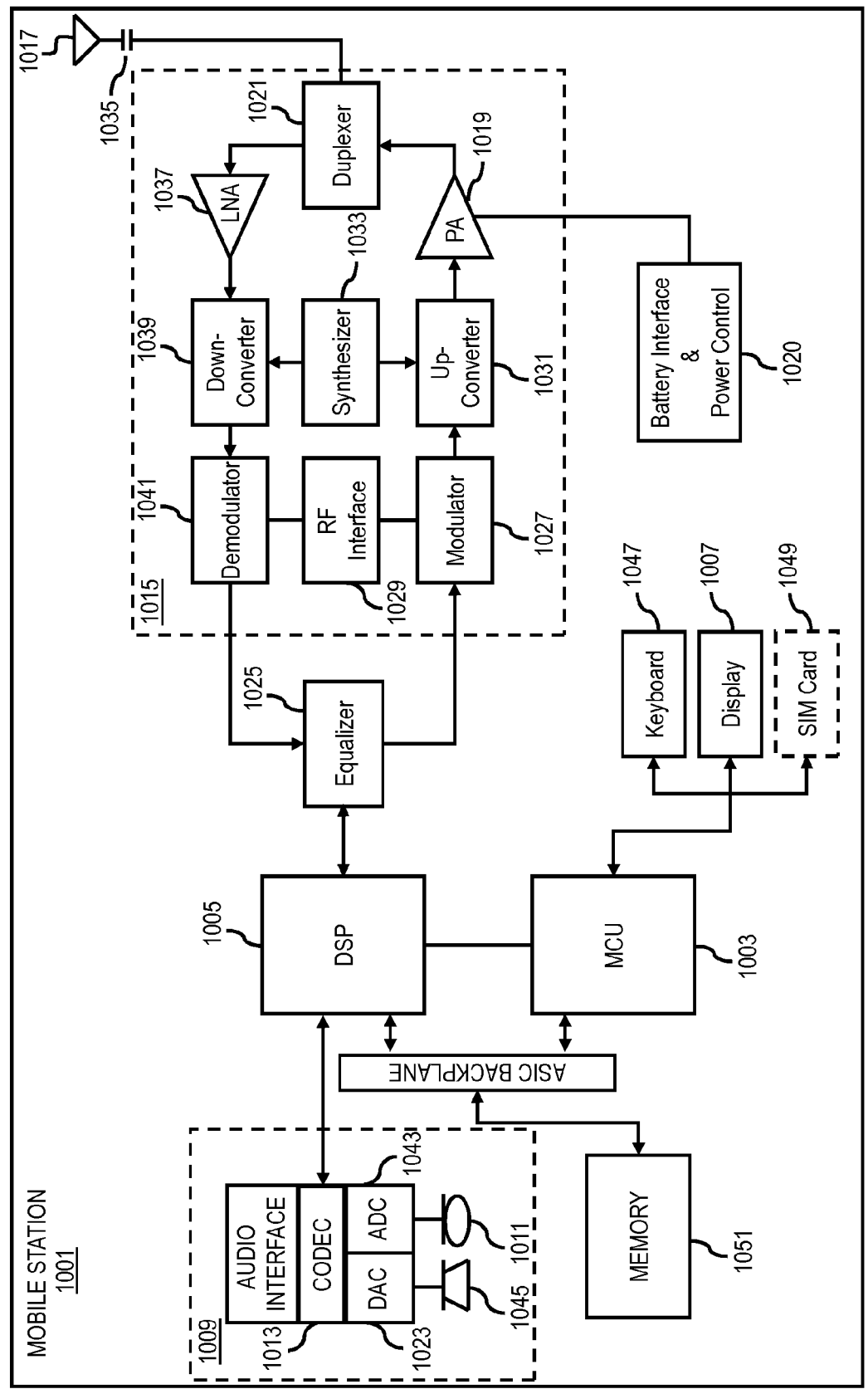

METHOD AND APPARATUS FOR CONDITIONAL DRIVING GUIDANCE

BACKGROUND

Service providers and device manufacturers (e.g., wireless, cellular, etc.) are continually challenged to deliver value and convenience to consumers by, for example, providing compelling network services. One area of interest has been the development of mapping and/or navigation applications that provide users of mobile devices (e.g., mobile phones, tablets, phablets, personal navigation devices (PNDs), etc.) with substantially real-time location-based information to assist them with their travels. As navigation systems become more widely used and integrated within vehicles, for example, drivers may become more comfortable with trusting and following the guidance information provided by such systems. However, current navigation systems lack the ability to inform a driver of a vehicle about the safety and legality of guidance information based on the vehicle's current position, direction, and speed and/or the driver's current behavior. For example, a guidance instruction may instruct the driver to exit the highway at a fast approaching exit. However, following this information would entail crossing multiple lanes of traffic, which may be dangerous.

SOME EXAMPLE EMBODIMENTS

Therefore, there is a need for an approach for presenting guidance information to a driver of a vehicle in terms of safety and legality based on the vehicle's current position, direction, and speed and/or the driver's current behavior.

According to one embodiment, a method comprises processing and/or facilitating a processing of contextual data associated with at least one vehicle to determine feasibility information associated with performing at least one maneuver using the vehicle. The method also comprises determining one or more user interface elements for presenting guidance information for the at least one maneuver based, at least in part, on the feasibility information.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of contextual data associated with at least one vehicle to determine feasibility information associated with performing at least one maneuver using the vehicle.

According to another embodiment, a computer-readable storage medium carries one or more sequences of one or more instructions which, when executed by one or more processors, cause, at least in part, an apparatus to process and/or facilitate a processing of contextual data associated with at least one vehicle to determine feasibility information associated with performing at least one maneuver using the vehicle. The apparatus is also caused to determine one or more user interface elements for presenting guidance information for the at least one maneuver based, at least in part, on the feasibility information.

According to another embodiment, an apparatus comprises means for processing and/or facilitating a processing of contextual data associated with at least one vehicle to determine feasibility information associated with performing at least one maneuver using the vehicle. The apparatus also comprises means for determining one or more user interface elements for presenting guidance information for the at least one maneuver based, at least in part, on the feasibility information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 10 is a diagram of a mobile terminal (e.g., handset) that can be used to implement an embodiment of the invention.

DESCRIPTION OF SOME EMBODIMENTS

Examples of a method, apparatus, and computer program for presenting guidance information to a driver of a vehicle in terms of safety and legality based on the vehicle's current position, direction, and speed and/or the driver's current behavior are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
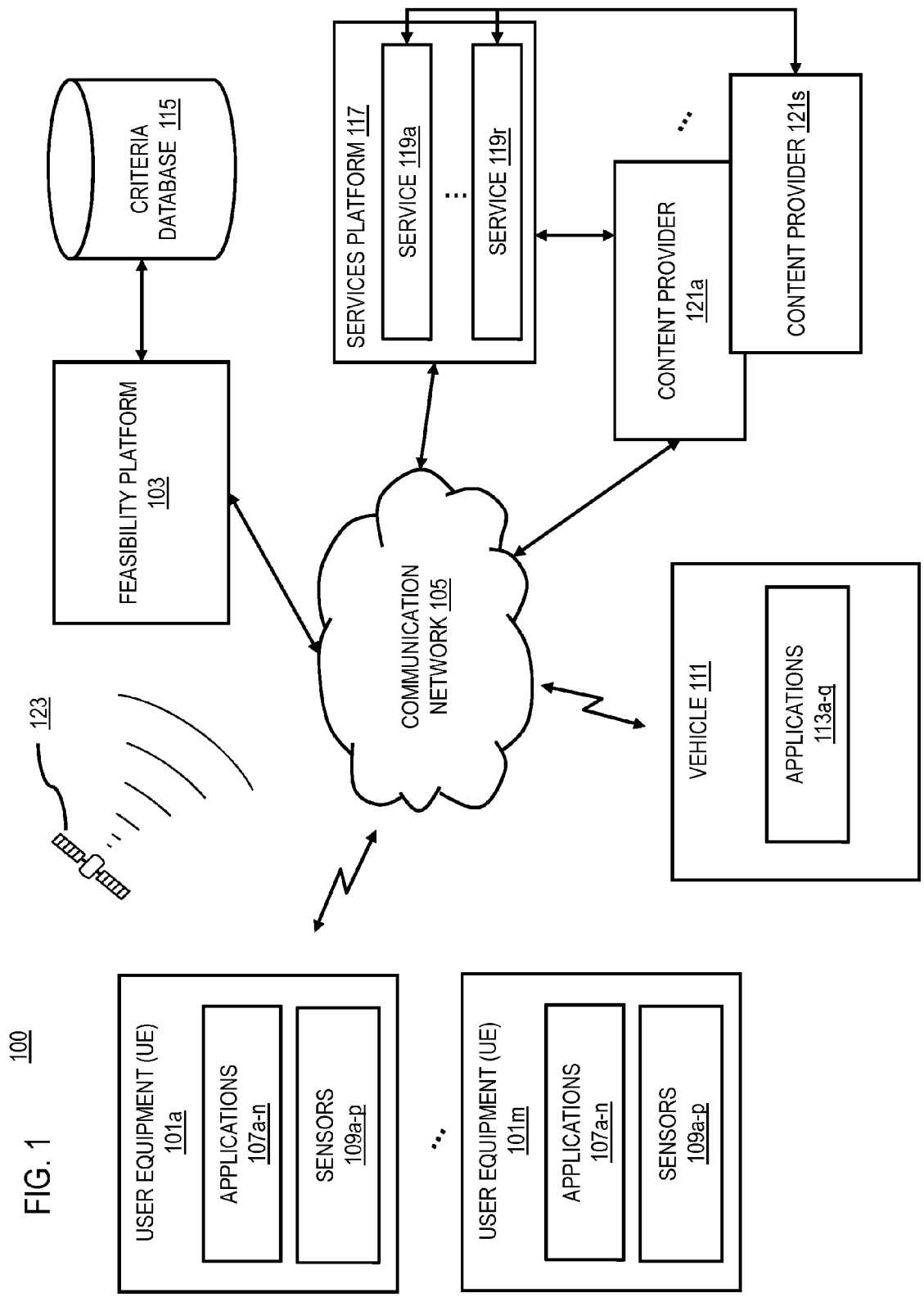
FIG. 1 is a diagram of a system capable of presenting guidance information to a driver of a vehicle in terms of safety and legality based on the vehicle's current position, direction, and speed and/or the driver's current behavior, according to one embodiment.

FIG. 1 is a diagram of a system capable of presenting guidance information to a driver of a vehicle in terms of safety and legality based on the vehicle's current position, direction, and speed and/or the driver's current behavior, according to one embodiment. As previously discussed, one area of interest among service providers and device manufacturers has been the development of mapping and/or navigation applications or services that provide users of mobile devices with substantially real-time location-based information to assist them with their travels (e.g., while commuting, exploring new locations, etc.). As navigation systems become more widely used and integrated within vehicles, for example, drivers may become more comfortable with listening, trusting, and following the guidance information provided by such systems. In particular, technological advances will make these systems even more embedded within a vehicle. However, current navigation systems lack the ability to inform a driver of a vehicle about the safety and legality of guidance information in terms of the vehicle's current position, direction, and speed and/or the driver's current behavior.

To address this problem, a system 100 of FIG. 1 introduces the capability to present guidance information to a driver of a vehicle in terms of safety and legality based on the vehicle's current position, direction, and speed and/or the driver's current behavior. As shown in FIG. 1, the system 100 comprises one or more user equipment (UE) 101a-101m (also collectively referred to as UEs 101) (e.g., mobile phones, tablets, phablets, PNDs, etc.) having connectivity to a feasibility platform 103 via a communication network 105. In one embodiment, the UEs 101 also include or have access to one or more applications 107a-107n (also collectively referred to as applications 107). By way of example, the applications 107 may include mapping and/or navigation applications, weather applications, traffic applications, media and entertainment applications, an Internet browser, social networking applications, etc. In addition, the UEs 101 include one or more sensors 109a-109p (also collectively referred to as sensors 109). In particular, the sensors may include, for example, a global positioning system (GPS) receiver, a compass, a magnetometer, an accelerometer, or a combination thereof. The system 100 also includes at least one vehicle 111 (e.g., a car) including or having access to one or more applications 113a-113q (also collectively referred to as applications 113) having connectivity to the feasibility platform 103 via the communication network 105. More specifically, the applications 113 (e.g., a diagnostic application, a communication application, a navigation application, etc.) enable the vehicle 111 to notify the feasibility platform 103 of its location, the status of one or more systems associated with the vehicle (e.g., gas mileage, engine wear, tire pressure, etc.), and/or the number of passengers present within the vehicle.

In one embodiment, the feasibility platform 103 may include or be associated with at least one criteria database 115. In one example embodiment, the feasibility platform 103 may exist in whole or in part within a UE 101, or independently and the at least one criteria database 115 may exist in whole or in part within the feasibility platform 103. The at least one criteria database 115 may include, at least in part, one or more lists of one or more safety criteria (e.g., reducing a vehicle's speed while driving during inclement weather or under a heavy load), one or more vehicle-related regulations (e.g., entering a high-occupancy vehicle (HOV) lane is prohibited without any passengers in the vehicle), or a combination thereof. The criteria database 115 may also include one or more lists of one or more rendering characteristics for presenting guidance information, including one or color parameters (e.g., green for safe, yellow for warning, and red for prohibited), one or more display parameters (e.g., fonts, animations, etc.), one or more media modes (e.g., graphics only, audio only, or a combination thereof), or a combination thereof related to the feasibility information. In addition, the criteria database 115 also may include one or more schedules for determining the contextual data associated with the vehicle, and/or one or more rules for modifying the one or more display devices, and/or one or more rules for transmitting the contextual data to one or more third parties (e.g., the police). Further, the at least one criteria database 115 may also include road geometry data, speed limit information, lane boundary information, one or more turn restrictions, or a combination thereof.

The UEs 101 are also connected to a services platform 117 via the communication network 105. In one embodiment, the services platform 117 includes one or more services 119a-119r (also collectively referred to as services 119). The services 119 may include a wide variety of services such as content provisioning services for one or more of the applications 107, the applications 113, or a combination thereof. By way of example, the services 119 may include mapping and/or navigation services, weather services, traffic services, social networking services, etc. In one embodiment, the UEs 101, the services platform 117, and the services 119 also have connectivity to one or more content providers 121a-121s (also collectively referred as content providers 121). The content providers 121 also may provision a wide variety of content (e.g., maps, navigation routes, etc.) to the components of the system 100.

In one embodiment, the feasibility platform 103, the applications 107 (e.g., a mapping and/or navigation application), the applications 113, or a combination thereof may utilize one or more location-based technologies (e.g., GPS, cellular triangulation, Assisted GPS (A-GPS), etc.) to determine a location of a UE 101, the vehicle 111, or a combination thereof, to make a request to one or more services 119 for location-based data (e.g., mapping and/or navigation information) based on a position relative to the UE 101, the vehicle 111, or a combination thereof. For example, a UE 101 may include a GPS receiver 109 to obtain geographic coordinates from the satellites 123 to determine its current location.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

In one embodiment, the system 100 processes sensor information associated with at least one vehicle, one or more display devices, or a combination thereof to determine at, at least in part, a position, a direction, a speed, or a combination thereof associated with at least one vehicle. By way of example, the sensor information associated with the vehicle 111 may be determined by the system 100 from an internal GPS receiver, for example, or from one or more of the applications 113 (e.g., a mapping and/or navigation application) and sensor information associated with the one or more display devices may be determined by the system 100 from one or more of the sensors 109 (e.g., a GPS receiver, a compass, a magnetometer, an accelerometer, or a combination thereof). In addition to the position, the direction, the speed, or a combination thereof, the system 100 may also process the sensor information to determine visibility information (e.g., a time of day or a weather condition such as fog or rain), drivability information (e.g., the vehicle's current weight, tire pressure, center of gravity, etc.), one or more traffic conditions, and/or any other information that may affect the feasibility of executing a particular maneuver.

In one or more embodiments, the system 100 processes and/or facilitates a processing of contextual data associated with the vehicle (e.g., the position, direction, and/or speed of the vehicle) to determine feasibility information associated with performing at least one maneuver using the vehicle (e.g., exiting a highway). More specifically, in one embodiment, the system 100 determines the feasibility information by comparing the guidance information associated with at least one maneuver against the contextual data associated with the vehicle, the driver of the vehicle, or a combination thereof in terms of one or more safety criteria, one or more vehicle-related regulations, or a combination thereof. By way of example, a mapping and/or navigation application 107 of a UE 101 (e.g., a mobile phone) or a mapping and/or navigation application 113 associated with the vehicle (e.g., as part of an in-dash display) may instruct a driver of a vehicle to exit the highway on the right at the next exit. At substantially the same time, the system 100 determines based, at least in part, on the position of the vehicle (e.g., in the far left lane of a multiple lane highway) and the speed at which the vehicle is traveling (e.g., in excess of the speed limit) that exiting the highway in the current context may be dangerous and therefore not feasible.

In one embodiment, the system 100 processes and/or facilitates a processing of the contextual data (e.g., a speed) against one or more safety criteria (e.g., reducing the speed of the vehicle during inclement weather), one or more vehicle-related regulations (e.g., not exceeding the designated speed limit), or a combination thereof to determine the feasibility information. For example, the system 100 can determine that passing is not permitted on a particular two-lane highway on which the vehicle 111 is traveling. As a result, the system 100 determines that the feasibility of passing in this context is low.

In one embodiment, the system 100 processes and/or facilitates a processing of the contextual data to determine behavior information for at least one operator of the at least one vehicle (i.e., the driver). By way of example, the system 100 can process the contextual data to determine whether the driver is slouching in his or her seat, changing gears at inappropriate times, driving too slow or too fast, or a combination thereof. More specifically, in one example use case, the system 100 determine that the driver of the vehicle 111 is changing gears at inappropriate times based, at least in part, on the vehicle's tachometer or engine temperature sensor, for example. In addition, the system 100 can determine whether the at least one operator is accompanied by one or more other passengers in the vehicle based, at least in part, on the vehicle's electric circuitry, one or more of the applications 113, or a combination thereof.

The system 100 determines one or more rendering characteristics for presenting the guidance information in certain embodiments based, at least in part, on one or more color parameters, one or more display parameters, one or more media modes, or a combination thereof. By way of example, the system 100 may determine the one or more rendering characteristics based, at least in part, on at least one default setting and/or at least one user preference or input stored in the at least one criteria database 115, for example. In one example use case, the system 100 can determine that feasible guidance information (e.g., a navigation arrow pointing to an exit in a mapping and/or navigation application) by default will be rendered in green, cautionary guidance information rendered in yellow, and unsafe or illegal guidance information rendered in red. In another example use case, the system 100 may determine that feasible guidance information by default will be presented as part of a visual display (e.g., an in-dash display), cautionary guidance information as part of a voice warning, and unsafe or illegal guidance as part of both a visual display (e.g., a heads-up display) and an audible alert.

In one embodiment, the system 100 determines one or more user interface elements for presenting the guidance information for the at least one maneuver (e.g., "take the next exit on the right") based, at least in part, on the feasibility information. In particular, the one or more interface elements include the one or more rendering characteristics, one or more display devices, or a combination thereof. For example, the one or more display devices may include, at least in part, a user device display (e.g., a UE 101 such as a mobile phone), a vehicle in-dash display, a vehicle heads-up display, or a combination thereof. Further, the guidance information includes, at least in part, road geometry data, speed limit information, lane boundary information, one or more turn restrictions, or a combination thereof. As a result, in one example use case, the system 100 first determines the one or more display devices associated with a vehicle and then presents guidance information on the one or more display devices and in the manner that will best inform the driver about the safety and legality of the guidance information.

In one or more embodiments, the system 100 causes, at least in part, at least one modification of the one or more display devices, at least one transmission of the contextual data to one or more third parties, or a combination thereof based, at least in part, on the behavior information (e.g., the behavior of the driver of the vehicle). By way of example, if the system 100 determines that the operator of the at least one vehicle is driving dangerously or in an unsafe manner (e.g., driving too slow or too fast, changing gears at inappropriate times, etc.), then the system 100 can cause, at least in part, a disabling of the vehicle's entertainment system (e.g., an infotainment system, a radio, one or more in-vehicle video monitors, or a combination thereof), hands-free calling capabilities, or a combination thereof so that the driver may improve his or her focus on the road. Similarly, in one example use case, the system 100 can also cause, at least in part, at least one transmission of the unsafe activity data to one or more authorities (e.g., the police or the vehicle rental agency), the insurance firm associated with the driver and/or the at least one vehicle (e.g., for making a rate adjustment), one or more family members (e.g., a parent when the vehicle is being driven by a young adult), or a combination thereof. Further, in one embodiment, the system 100 can also present to the driver via one or more display devices the impact of his or her unsafe activities on the at least one vehicle in terms of gas mileage, engine wear, etc.

In one or more embodiments, the system 100 determines the contextual data (e.g., the position, direction, speed of the at least one vehicle), the feasibility information (e.g., safe or unsafe, legal or illegal), the one or more interface elements (e.g., for presenting guidance information), or a combination thereof in substantially real-time, periodically, according to a schedule, on demand, or a combination thereof. More specifically, in one embodiment, it is contemplated that the system 100 determines the one or more interface elements relative to the current contextual data and/or feasibility information in a dynamic manner.

By way of example, the UEs 101, the feasibility platform 103, the applications 107, the sensors 109, the vehicle 111, the applications 113, the at least one criteria database 115, the services platform 117, the services 119, the content providers 121, and the satellites 123 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
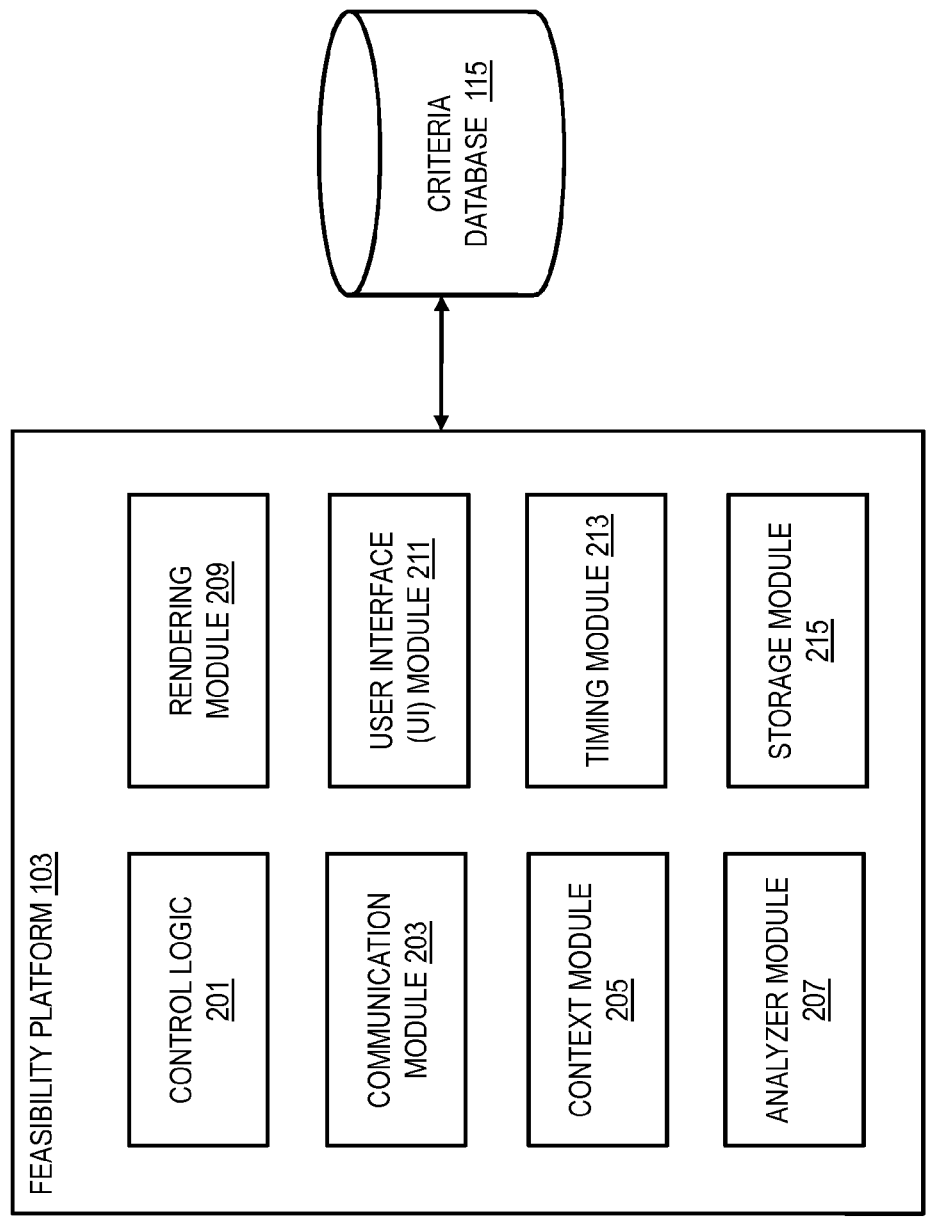
FIG. 2 is a diagram of the components of a feasibility platform, according to one embodiment.

FIG. 2 is a diagram of the components of the feasibility platform 103, according to one embodiment. By way of example, the feasibility platform 103 includes one or more components for presenting guidance information to a driver of a vehicle in terms of safety and legality based on the vehicle's current position, direction, and speed and/or the driver's current behavior. It is contemplated that the functions of these components may be combined in one or more components or performed by other components of equivalent functionality. In this embodiment, the feasibility platform 103 includes a control logic 201, a communication module 203, a context module 205, an analyzer module 207, a rendering module 209, a user interface (UI) module, a timing module 213, and a storage module 215.

In one embodiment, the control logic 201 oversees tasks, including tasks performed by the communication module 203, the context module 205, the analyzer module 207, the rendering module 209, the UI module 211, the timing module 213, and the storage module 215. For example, although the other modules may perform the actual task, the control logic 201 may determine when and how those tasks are performed or otherwise direct the other modules to perform the task. In certain embodiments, the control logic 201, in connection with the communication module 203 and the context module 205, also may be used to cause, at least in part, at least one modification of the one or more display devices (e.g., disabling the vehicle's entertainment system), at least one transmission of the contextual data to one or more third parties (e.g., the police), or a combination hereof based, at least in part, on the behavior information (e.g., unsafe driving data).

The communication module 203 in certain embodiments is used for communication between the UEs 101, the feasibility platform 103, the applications 107, the sensors 109, the at least one vehicle 111, the applications 113, the at least one criteria database 115, the services platform 117, the services 119, the content providers 121, and the satellites 123. In one embodiment, the communication module 203 may also be used to communicate commands, requests, data, etc. As previously discussed, in certain embodiments, the communication module 203 may also be used to cause, at least in part, at least one transmission of the contextual data to one or more third parties.

In one embodiment, the context module 205 is used to process and/or facilitate a processing of sensor information associated with the vehicle (e.g., information determined from an internal GPS receiver and/or one or more of the applications 113), the one or more display devices (e.g., information determined from a GPS receiver, a compass, a magnetometer, an accelerometer, or a combination thereof), or a combination thereof to determine, at least in part, the position, the direction, the speed, or a combination thereof associated with the vehicle. The context module 205, in connection with the analyzer module 207, may also be used to process and/or facilitate a processing of the contextual data associated with the at least one vehicle to determine feasibility information associated with performing at least one maneuver using the vehicle. By way of example, the context module 205 first determines the position, direction, speed of the vehicle in connection with performing the at least one maneuver (e.g., exiting a highway) and at substantially the same time, the analysis module 207 determines whether the maneuver meets one or more safety criteria, one or more vehicle-related regulations stored in the at least one criteria database 115 and/or whether the behavior of the driver (e.g., driving too slow or too fast) is consistent with safely and legally performing the particular maneuver.

In one or more embodiments, the analyzer module 207 processes and/or facilitates a processing of the contextual data against one or more safety criteria, one or more vehicle-related regulations, or a combination thereof to determine the feasibility information. By way of example, the analyzer module 207 can compare the current speed of the vehicle against a recommended speed for driving in inclement weather (e.g., fog or rain) and/or the posted speed limit to determine the feasibility information (e.g., whether the current speed is safe or unsafe and legal or illegal). The analyzer module 207, in connection with the context module 205, may also be used to process and/or facilitate a processing of the contextual data to determine behavior information for at least one operator of the at least one vehicle. For example, the context module 205 can determine that the driver of the vehicle is shifting the vehicle at inappropriate times based, at least in part, on the vehicle's tachometer or engine temperature sensor, for example, and the analyzer module 207 can then determine that a plurality of inappropriate shifts on a flat road, for example, is consistent with unsafe driving behavior.

In one embodiment, the rendering module 209, in connection with the UI module 211, is used to determine the one or more rendering characteristics based, at least in part, on one or more color parameters, one or more display parameters, one or more media modes, or a combination thereof. By way of example, the rendering module 209 can determine the one or more rendering characteristic based, at least in part, on at least one default setting or at least one user preference or input determined by the UI module 211. In particular, the one or more default rendering characteristics may include rendering feasible guidance information in green, cautionary guidance information in yellow, and unsafe and/or illegal guidance in red, for example. The rendering module 209, in connection with the communication module 203, may also be used to determine the one or more user interface elements for presenting guidance information for the at least one maneuver based, at least in part, on the feasibility information. More specifically, in one embodiment, the communication module 203 can determine which, if any, of the one or more display devices are associated with the vehicle and then the rendering module 209 can determine how to best present the guidance information (e.g., road geometry) on each of the one or more associated devices.

In certain embodiments, the timing module 213, in connection with the UI module 211, is used to determine the contextual data, the feasibility information, the one or more user interface elements, or a combination thereof in substantially real-time, periodically, according to a schedule, on demand, or a combination thereof. For example, the timing module 213 may follow one or more schedules stored in the at least one criteria database 115.

In one embodiment, the storage module 215 is used to manage the storage of the one or more lists of one or more safety criteria, one or more vehicle-related regulations, or a combination thereof stored in the at least one criteria database 115. The storage module 215 may also be used to manage the storage of the one or more lists of one or more rendering characteristics related to the feasibility information. In addition, the storage module 215 also may be used to manage the one or more schedules for determining the contextual data associated with the vehicle, one or more rules relative to modifying the one or more display devices, and/or one or more rules for transmitting the contextual data to one or more third parties also stored in the at least one criteria database 115. Further, the storage module 215 may also be used to manage the storage of any road geometry data, speed limit information, lane boundary information, one or more turn restrictions, or a combination thereof stored in the at least one criteria database 115.

Figure 3:
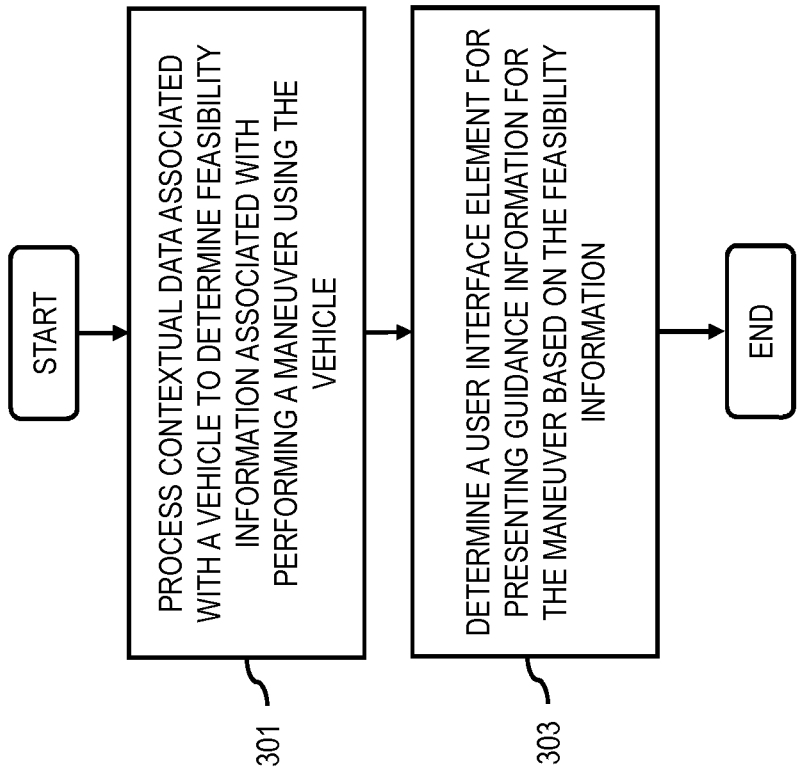
FIGS. 3-5 are flowcharts of processes for presenting guidance information to a driver of a vehicle in terms of safety and legality based on the vehicle's current position, direction, and speed and/or the driver's current behavior, according to one embodiment.
Figure 4:
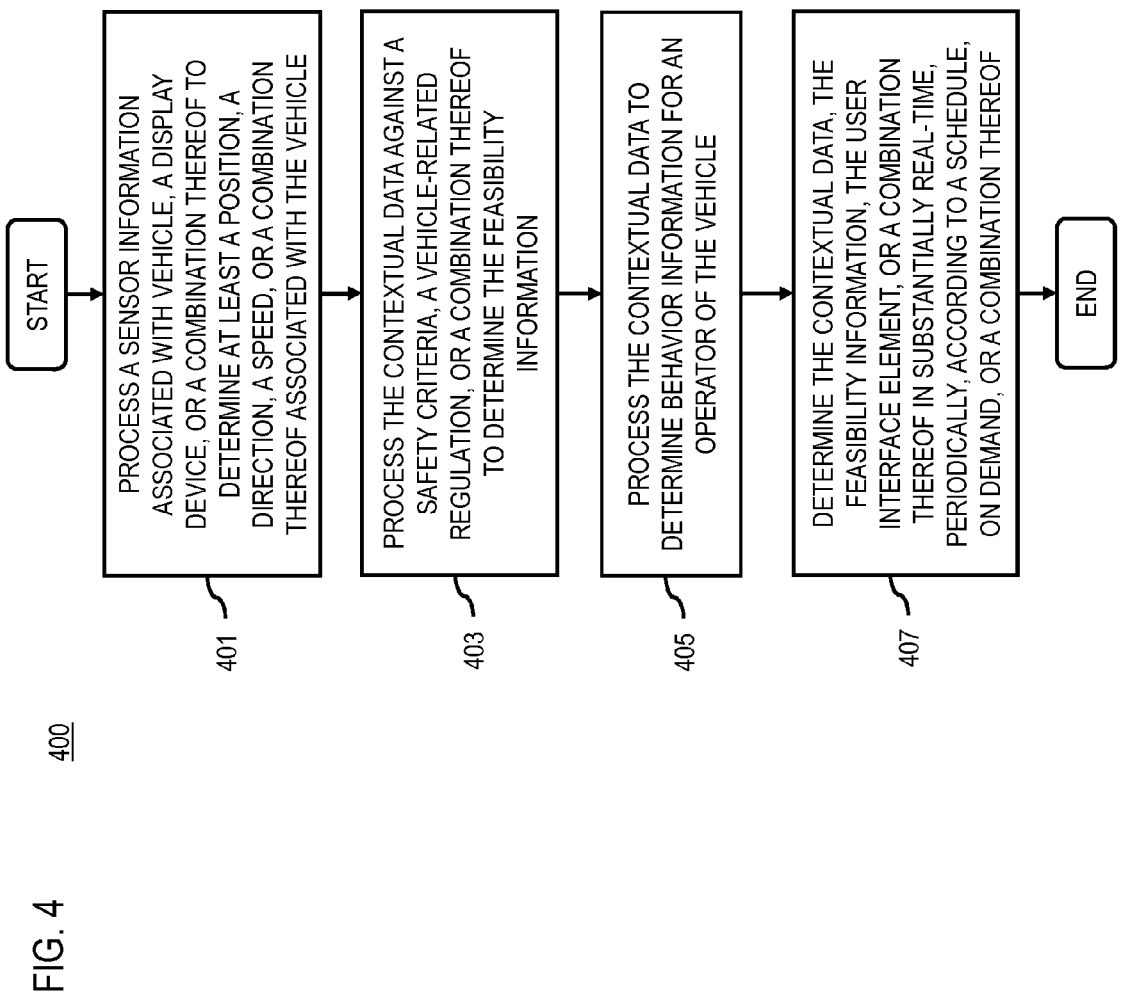
Figure 5:
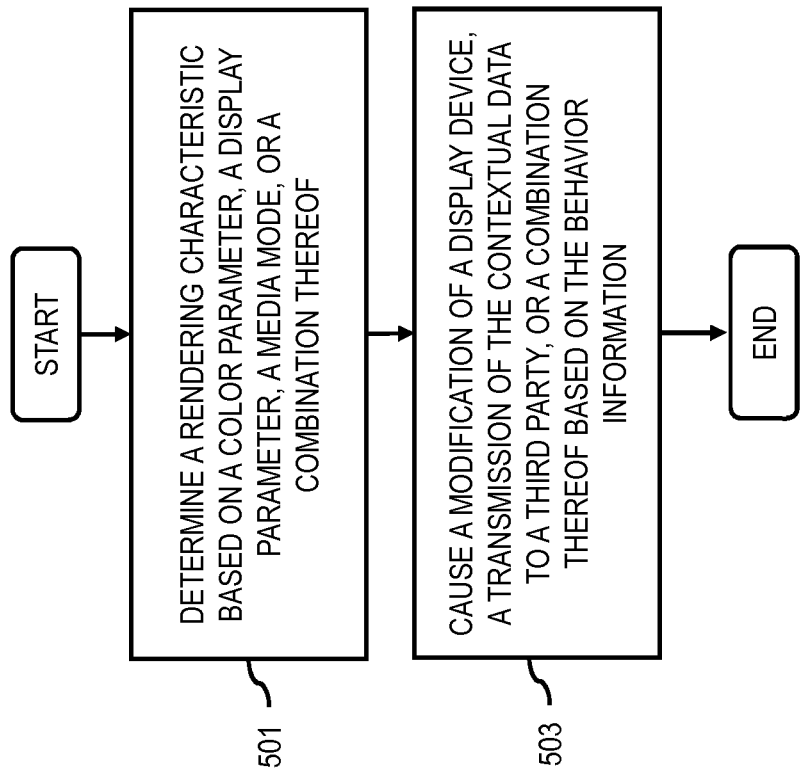
Figure 9:
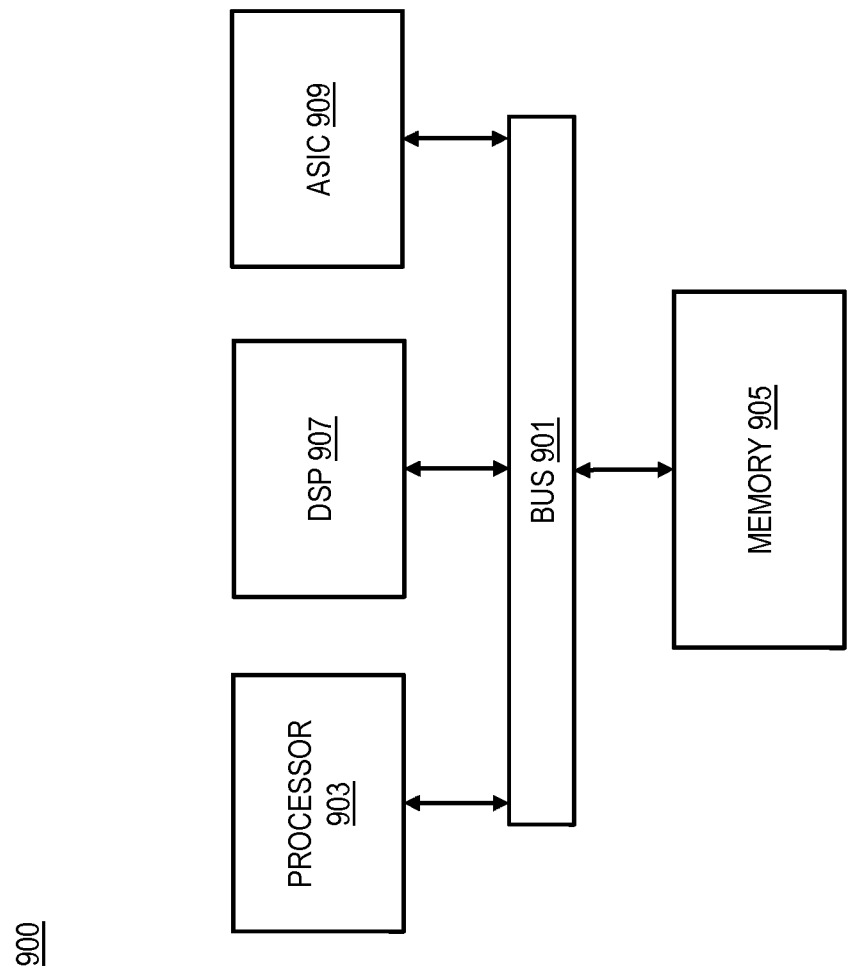
FIG. 9 is a diagram of a chip set that can be used to implement an embodiment of the invention.

FIGS. 3-5 are flowcharts of processes for presenting guidance information to a driver of a vehicle in terms of safety and legality based on the vehicle's current position, direction, and speed and/or the driver's current behavior, according to one embodiment. In one embodiment, the feasibility platform 103 performs the process 300 and is implemented in, for instance, a chip set including a processor and a memory as shown in FIG. 9. In step 301, the feasibility platform 103 processes and/or facilitates a processing of contextual data associated with at least one vehicle to determine feasibility information associated with performing at least one maneuver using the vehicle. By way of example, the contextual data may include, at least in part, a position, a direction, a speed or a combination thereof associated with the vehicle. In certain embodiments, the feasibility platform 103 can also determine visibility information (e.g., a time of day or weather condition), drivability information (e.g., the current weight of the car), traffic information, and/or any other contextual data that may affect the feasibility of performing a particular maneuver. In one example use case, the contextual data may also include behavior information associated with the at least one operator of the at least one vehicle (e.g., driving too fast or too slow, changing gears at inappropriate times, slouching, etc.) that may also affect the feasibility of performing a particular maneuver. In particular, in one embodiment, the feasibility platform 103 determines the feasibility information by comparing the guidance information associated with the at least one maneuver against the contextual data associated with the vehicle, the driver, or a combination thereof in terms of one or more safety criteria and/or one or more vehicle-related regulations.

By way of further example, a mapping and/or navigation application associated with the vehicle, one or more display devices (e.g., a mobile phone), or a combination thereof may recommend that a driver of the vehicle exit the highway on the right at the next exit. At substantially the same time, the feasibility platform 103 determines based, at least in part, on the position of the vehicle (e.g., in the far left lane of a multiple lane highway) and the speed at which the vehicle is traveling (e.g., in excess of the speed limit) that exiting the highway in the current context may be dangerous and therefore not feasible.

In step 303, the feasibility platform 103 determines one or more user interface elements for presenting guidance information for the at least one maneuver based, at least in part, on the feasibility information. In particular, the one or more user interface elements include one or more rendering characteristics, one or more display devices, or a combination thereof. By way of example, the one or more rendering characteristics (i.e., the way in which the guidance information is presented to the at least one operator of the vehicle) are based, at least in part, on one or more color parameters, one or more display parameters, one or more media modes (e.g., graphics only, audio only, or a combination thereof), or a combination thereof. By way of further example, the one or more display devices include, at least in part, a user device display (e.g., a mobile phone or tablet), a vehicle in-dash display, a vehicle heads-up display, or a combination thereof. In addition, one or more of the one or more display devices may also have voice warning capabilities. Further, in one embodiment, the guidance information includes, at least in part, road geometry data, speed limit information, lane boundary information, one or more turn restrictions, or a combination thereof. As a result, in one example use case, the feasibility platform 103 can render feasible guidance information on one or more display devices (e.g., a vehicle in-dash display) in green, cautionary guidance information in yellow, and unsafe and/or illegal guidance information in red.

FIG. 4 depicts a process 400 of determining and/or processing contextual data, including sensor information. In one embodiment, the feasibility platform 103 performs the process 400 and is implemented in, for instance, a chip set including a processor and a memory as shown in FIG. 9. In step 401, processes and/or facilitates a processing of sensor information associated with the vehicle, the one or more display devices, or a combination thereof to determine, at least in part, a position, a direction, a speed, or a combination thereof associated with the vehicle, wherein the contextual data is based, at least in part, on the position, the direction, the speed, or a combination thereof. By way of example, the sensor information associated with the at least one vehicle may be determined by the feasibility platform 103 form an internal GPS receiver, for example, or from one or more of the applications 113 (e.g., a mapping and/or navigation application) and sensor information associated with the one or more display devices may be determined by the feasibility platform 103 from one or more of the sensors 109 (e.g., a GPS receiver, a compass, a magnetometer, an accelerometer, or a combination thereof). In one example use case, the sensor information may also include visibility information (e.g., a time of day or weather condition), drivability information (e.g., the vehicle's current weight, tire pressure, center of gravity, etc.), one or more traffic conditions, and/or any other information that may affect the feasibility of executing a particular maneuver.

In step 403, the feasibility platform 103 processes and/or facilitates a processing of the contextual data against one or more safety criteria, one or more vehicle-related regulations, or a combination thereof to determine the feasibility information. For example, the one or more safety criteria may be based, at least in part, reducing the speed of the at least one vehicle during inclement weather, maintaining the designated speed limit, maintaining a reasonable distance between vehicles, reducing speeds while the at least one vehicle is being driven under heavy loads (e.g., moving furniture), etc. By way of further example, the one or more vehicle-related regulations may be based, at least in part, a designated speed limit, one or more lane boundary restrictions (e.g., no passing), one or more turning restrictions (e.g., no left turns), one or more occupancy requirements (e.g., requirements for using a HOV lane), etc.

In step 405, the feasibility platform 103 processes and/or facilitates a processing of the contextual data to determine behavior information for at least one operator of the at least one vehicle, wherein the determination of the feasibility information, the determination of the one or more user interface elements, or a combination thereof is further based, at least in part, on the behavior information; and wherein the one or more user interface elements are for presenting the behavior information. By way of example, the feasibility platform 103 can process the contextual data to determine whether the at least one operator of the at least one vehicle (e.g., the driver) is slouching in his or her seat, changing gears at inappropriate times (e.g., based on the vehicle's tachometer and/or engine temperature sensors), driving to too slow or too fast, whether additional passengers are in the vehicle, or a combination thereof. Consequently, in one example use case, if the feasibility platform 103 determines that the operator of the at least one vehicle is demonstrating unsafe driving behavior, then the feasibility platform 103 may determine that one or more maneuvers, which are generally feasible in a particular context, are no longer feasible in the current context.

In step 407, the feasibility platform 103 determines the contextual data, the feasibility information, the one or more user interface elements, or a combination thereof in substantially real-time, periodically, according to a schedule, on demand, or a combination thereof. By way of example, in one embodiment, it is contemplated that the feasibility platform 103 determines the one or more interface elements relative to the current contextual data and/or feasibility information in a dynamic manner.

FIG. 5 depicts a process 500 of presenting the guidance information to the at least one operator of the at least one vehicle and/or to one or more third parties. In one embodiment, the feasibility platform 103 performs the process 500 and is implemented in, for instance, a chip set including a processor and a memory as shown in FIG. 9. In step 501, the feasibility platform 103 determines the one or more rendering characteristics based, at least in part, on one or more color parameters, one or more display parameters, one or more media modes, or a combination thereof. By way of example, the feasibility platform 103 may determine the one or more rendering characteristics based, at least in part, on at least one default setting and/or at least one user preference or input stored in the at least one criteria database 115, for example. In one example use case, the feasibility platform 103 can determine that feasible guidance information (e.g., a navigation arrow pointing to an exit in a mapping and/or navigation application) by default will be rendered in green, cautionary guidance information in yellow, and unsafe and/or illegal guidance information in red. In another example use case, the feasibility platform 103 may determine that feasible guidance information by default will be presented as part of a visual display (e.g., an in-dash display), cautionary guidance information as part of a voice warning, and unsafe or illegal guidance as part of both a visual display (e.g., a heads-up display) and an audible alert.

In step 503, the feasibility platform 103 causes, at least in part, at least one modification of the one or more display devices, at least one transmission of the contextual data to one or more third parties, or a combination thereof based, at least in part, on the behavior information. For example, in one example use case, if the feasibility platform 103 determines that the operator of the at least one vehicle is driving dangerously or in an unsafe manner (e.g., driving too slow or two fast), then the feasibility platform 103 can cause, at least in part, a disabling of the vehicle's entertainment system (e.g., an infotainment system, a radio, one or more in-vehicle video monitors, or a combination thereof), hands-free calling capabilities, or a combination thereof so that the operator may improve his or her focus on the road. Similarly, in one example use case, the feasibility platform 103 can also cause, at least in part, at least one transmission of the unsafe driving activity (e.g., driving too fast) to one or more authorities (e.g., the police or the vehicle rental agency), the insurance firm associated with the operator and/or the at least one vehicle (e.g., for making a rate adjustment), one or more family members (e.g., a parent when the vehicle is being driven by a young adult), or a combination thereof. In one embodiment, the feasibility platform 103 can also present to the driver via the one or more display devices the impact of his or her unsafe activities on the at least one vehicle in terms of gas mileage, engine wear, etc.

Figure 6:
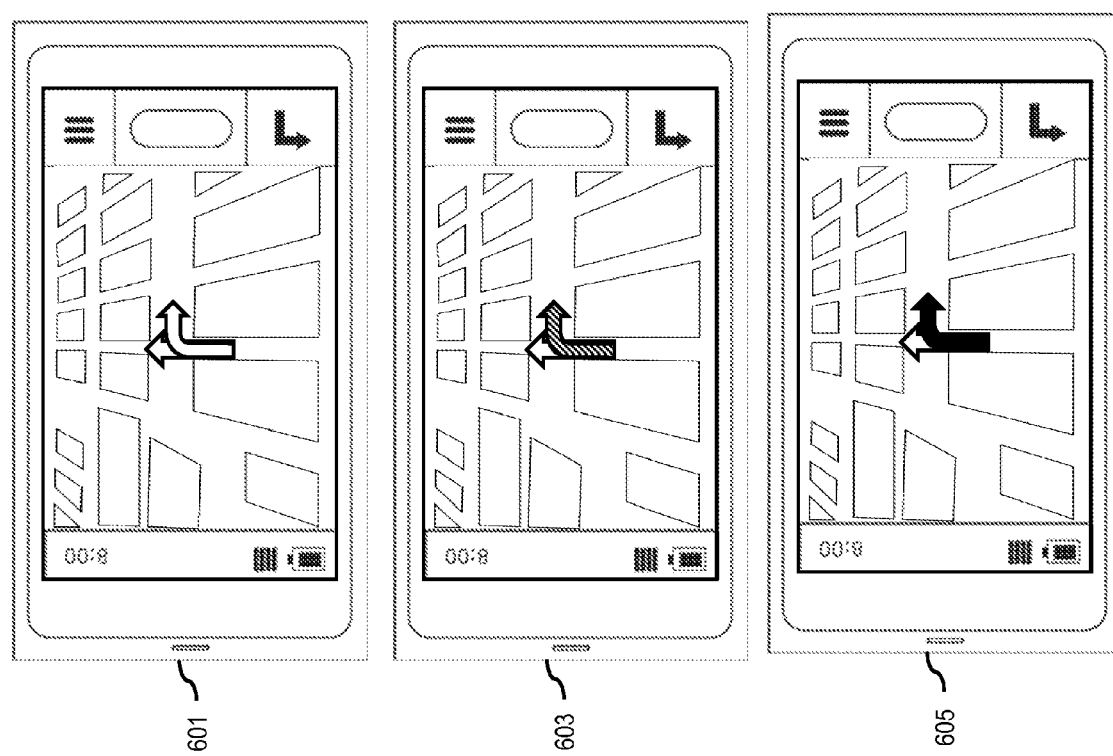
FIGS. 6 and 7 are diagrams of user interfaces utilized in the processes of FIG. 3-5, according to various embodiments.
Figure 7:
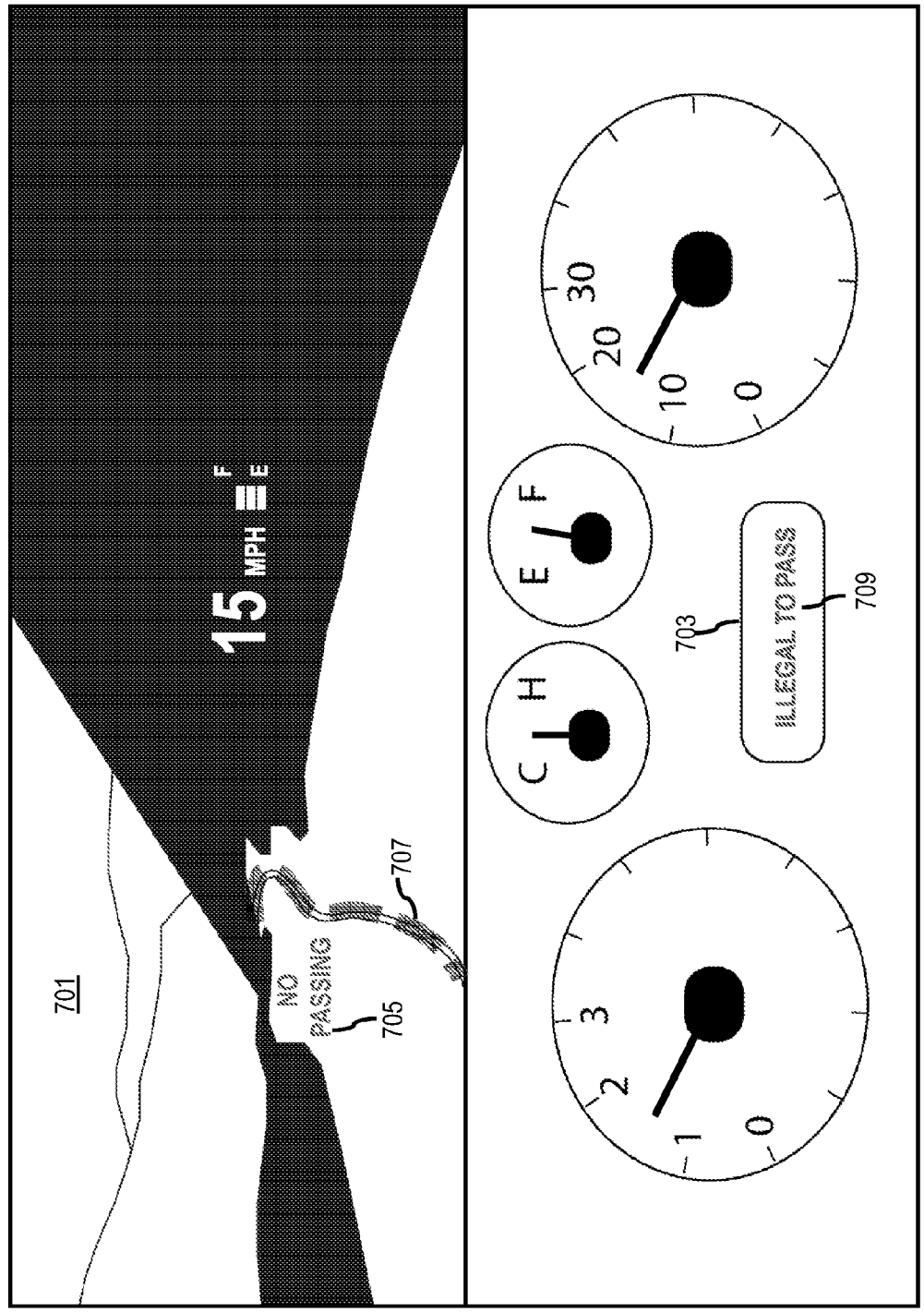

FIGS. 6 and 7 are diagrams of user interfaces utilized in the processes of FIGS. 3-5, according to various embodiments. As shown, the example user interfaces of FIGS. 6 and 7 include one or more user interface elements and/or functionalities created and/or modified based, at least in part, on information, data, and/or signals resulting from the processes (e.g., 300, 400, and 500) described with respect to FIGS. 3-5. More specifically, FIG. 6 illustrates three user interfaces (e.g., 601, 603, and 605) associated with at least one vehicle (not shown for illustrative convenience), each presenting guidance information for making at least one maneuver using the vehicle based, at least in part, on feasibility information. Similarly, FIG. 7 illustrates two user interfaces (e.g., 701 and 703) integrated with the at least one vehicle, each also depicting guidance information for making at least one maneuver with the vehicle based, at least in part, on feasibility information.

In the first example use case, the system 100 has already determined the contextual data, the feasibility information, and the one or more user interface elements associated with making a right turn with the vehicle as depicted in FIG. 6. In particular, in this example use case, the system 100 is guiding a driver of the vehicle to "make the next right turn." If the system 100 determines that the vehicle is within safe distance of the turn and in the right lane (i.e., the guidance information is feasible), then the system 100 may render the guidance information in green as depicted in interface 601. In contrast, if the system 100 determines that the vehicle is in the middle lane, but close to the safe distance, then the system 100 may render the guidance information in yellow as depicted in interface 603. However, if the system 100 determines that the vehicle is not within a safe distance of the turn and/or that the vehicle needs to cross a number of lanes to make the turn, then the system 100 may render the guidance information in red as depicted in interface 605. In certain embodiments, it is contemplated that this same information can also be presented by the system 100 on a vehicle in-dash display, a vehicle heads-up display, or a combination thereof.

In the second example use case, the system 100 has again already determined the contextual data, the feasibility information, and the one or more user interface elements associated with driving down a winding mountain road as depicted in FIG. 7. More specifically, in this example use case, the system 100 warns the driver that it is not feasible to pass another vehicle in the current context by rendering a red "No Passing" warning 705 and line 707 (dashed for illustrative convenience) on the vehicle's heads-up display unit 701. In one embodiment, the system 100 may animate the "No Passing" warning 705 and line 707 and/or cause, at least in part, a rendering of a voice warning if the driver disregards the initial warning and still attempts to pass another vehicle. Further, in this example use case and/or in use cases where a vehicle lacks a heads-up display unit, the system 100 can also warn the driver by rendering an "Illegal to Pass" warning 709, for example, on an in-dash display (e.g., the in-dash display 703). Similar to the "No Passing" warning 705 and line 707, the "Illegal to Pass" warning 709 may also be rendered by the system 100 in different colors and/or animated depending on the determined contextual data (e.g., if the driver attempts to pass another vehicle).

In another example use case, if the system 100 determines that the driver is or is about to start to driving on an HOV lane without having another passenger in the vehicle based, at least in part, on the sensor information associated with the vehicle (e.g., the position of the vehicle and the vehicle's digital circuitry) and the HOV lane data determined by the system 100 from the at least one criteria database 115, one or more service providers 119, one or more content providers 121, or a combination thereof, then the system 100 can cause, at least in part, the "Illegal to Pass" warning 709 of FIG. 7, to read "Illegal HOV Entry" in red or yellow, respectively, for example. Moreover, if the driver remains in the HOV lane despite the initial warning, then the system 100 can also animate the new warning 709 and/or cause, at least in part, a rendering of a voice warning as well.

The processes described herein for presenting guidance information to a driver of a vehicle in terms of safety and legality based on the vehicle's current position, direction, and speed and/or the driver's current behavior may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
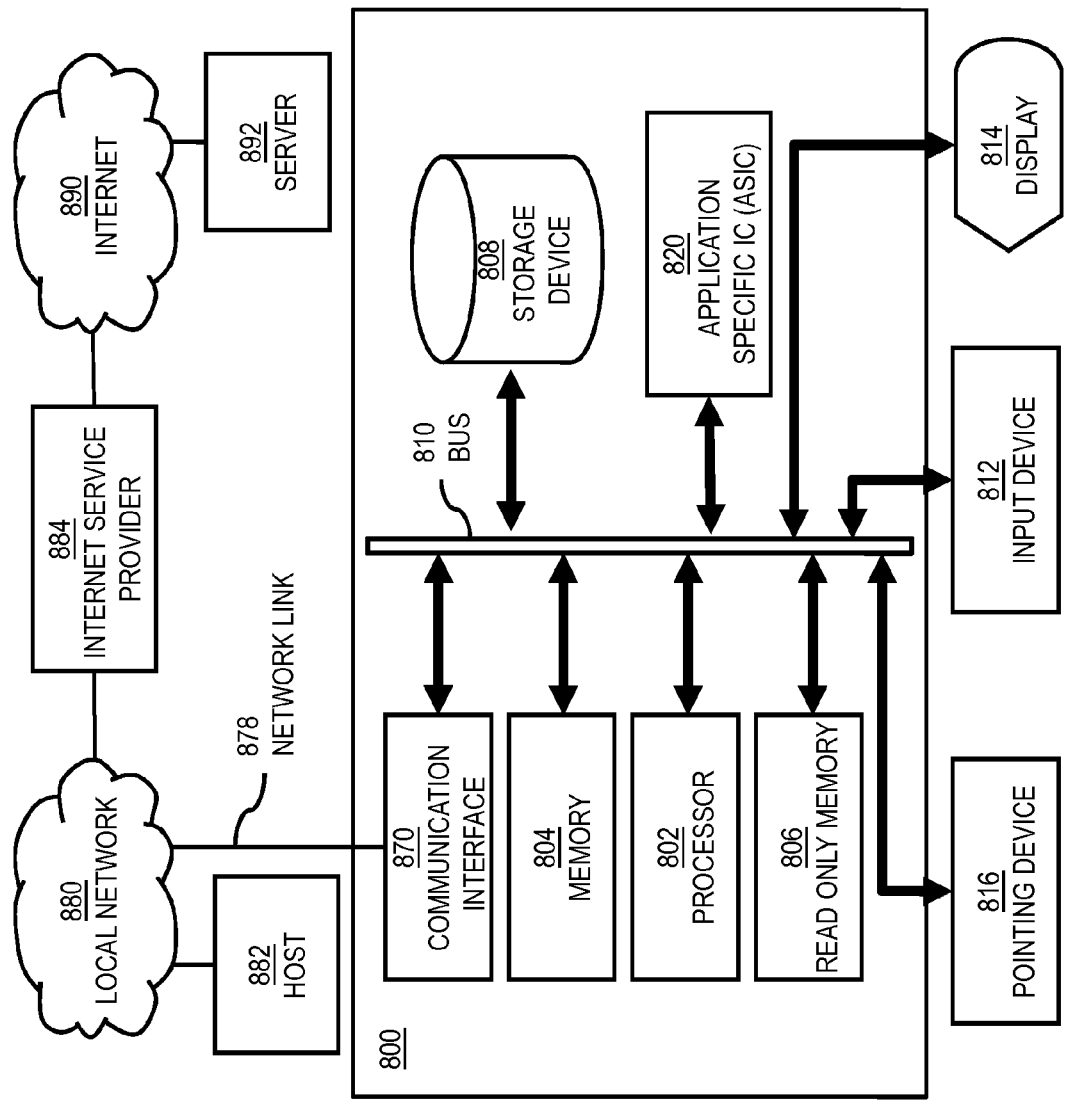
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to present guidance information to a driver of a vehicle in terms of safety and legality based on the vehicle's current position, direction, and speed and/or the driver's current behavior as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of presenting guidance information to a driver of a vehicle in terms of safety and legality based on the vehicle's current position, direction, and speed and/or the driver's current behavior.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to presenting guidance information to a driver of a vehicle in terms of safety and legality based on the vehicle's current position, direction, and speed and/or the driver's current behavior. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for presenting guidance information to a driver of a vehicle in terms of safety and legality based on the vehicle's current position, direction, and speed and/or the driver's current behavior. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for presenting guidance information to a driver of a vehicle in terms of safety and legality based on the vehicle's current position, direction, and speed and/or the driver's current behavior, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for presenting guidance information to a driver of a vehicle in terms of safety and legality based on the vehicle's current position, direction, and speed and/or the driver's current behavior to the UEs 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, worldwide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to present guidance information to a driver of a vehicle in terms of safety and legality based on the vehicle's current position, direction, and speed and/or the driver's current behavior as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of presenting guidance information to a driver of a vehicle in terms of safety and legality based on the vehicle's current position, direction, and speed and/or the driver's current behavior.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to present guidance information to a driver of a vehicle in terms of safety and legality based on the vehicle's current position, direction, and speed and/or the driver's current behavior. The memory 905 also stores the data associated with or generated by the execution of the inventive steps.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of presenting guidance information to a driver of a vehicle in terms of safety and legality based on the vehicle's current position, direction, and speed and/or the driver's current behavior. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of presenting guidance information to a driver of a vehicle in terms of safety and legality based on the vehicle's current position, direction, and speed and/or the driver's current behavior. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to present guidance information to a driver of a vehicle in terms of safety and legality based on the vehicle's current position, direction, and speed and/or the driver's current behavior. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for vehicle navigation guidance comprising facilitating a processing of and/or processing (1) data and/or (2) information and/or (3) at least one signal, the (1) data and/or (2) information and/or (3) at least one signal based, at least in part, on the following:
   a processing of contextual data associated with at least one vehicle against one or more safety criteria, one or more vehicle-related regulations, or a combination thereof to determine one or more dangerous or illegal activities, one or more people in the at least one vehicle, or a combination thereof associated with performing at least one maneuver using the at least one vehicle, the contextual data including one or more legal regulations; and at least one of:
   a disabling of the at least one vehicle's entertainment system, one or more calling capabilities, or a combination thereof, without user intervention,
   at least one transmission of data of the one or more dangerous or illegal activities to one or more authorities, to one or more insurance entities associated with the at least one vehicle, to the one or more people, or a combination thereof, to one or more family members of the one or more people, or a combination thereof, without user intervention, and
   at least one presentation of impact of the one or more dangerous or illegal activities on the vehicle.

2. A method of claim 1, wherein the (1) data and/or (2) information and/or (3) at least one signal are further based, at least in part, on the following:
   a processing of the contextual data to determine feasibility information associated with performing the at least one maneuver
   at least one determination of one or more user interface elements for presenting guidance information for the at least one maneuver based, at least in part, on the feasibility information,
   wherein the presentation of the guidance information includes, at least in part, road geometry data, speed limit information, lane boundary information, one or more turn restrictions, or a combination thereof.

3. A method of claim 2, wherein the (1) data and/or (2) information and/or (3) at least one signal are further based, at least in part, on the following:

a processing of the contextual data to determine behavior information for at least one operator of the at least one vehicle, wherein the determination of the feasibility information, the determination of the one or more user interface elements, or a combination thereof is further based, at least in part, on the behavior information; and wherein the one or more user interface elements are for presenting the behavior information.

4. A method of claim 3, wherein the (1) data and/or (2) information and/or (3) at least one signal are further based, at least in part, on the following:

at least one modification of the one or more display devices, at least one transmission of the contextual data to one or more third parties, or a combination thereof based, at least in part, on the behavior information.

5. A method of claim 2, wherein the one or more legal regulations include one or more speed limits, one or more turn restrictions, or a combination thereof, and the one or more user interface elements include one or more rendering characteristics, one or more display devices, or a combination thereof.

6. A method of claim 5, wherein the (1) data and/or (2) information and/or (3) at least one signal are further based, at least in part, on the following:

at least one determination of the one or more rendering characteristics based, at least in part, on one or more color parameters, one or more display parameters, one or more media modes, or a combination thereof.

7. A method of claim 5, wherein the one or more display devices include, at least in part, a user device display, a vehicle in-dash display, a vehicle heads-up display, or a combination thereof.

8. A method of claim 2, wherein the (1) data and/or (2) information and/or (3) at least one signal are further based, at least in part, on the following:

a processing of the contextual data against one or more safety criteria, one or more vehicle-related regulations, or a combination thereof to determine the feasibility information as dangerous or illegal; and at least one presentation of a dangerous or illegal warning with respect to performing the at least one maneuver.

9. A method of claim 8, wherein the (1) data and/or (2) information and/or (3) at least one signal are further based, at least in part, on the following:

a processing of the contextual data to determine at least one subsequent maneuver that is safe and legal to perform, assuming the at least one maneuver is not performed;

at least one presentation of a recommendation of the at least one subsequent maneuver; and at least one determination of the contextual data, the feasibility information, the one or more user interface elements, or a combination thereof in substantially real-time, periodically, according to a schedule, on demand, or a combination thereof.

10. A method of claim 2, wherein the (1) data and/or (2) information and/or (3) at least one signal are further based, at least in part, on the following:

a processing of sensor information associated with the at least one vehicle, the one or more display devices, or a combination thereof to determine, at least in part, a position, a direction, a speed, or a combination thereof associated with the at least one vehicle, wherein the contextual data is based, at least in part, on the position, the direction, the speed, or a combination thereof.

11. An apparatus for vehicle navigation guidance, comprising: at least one processor; and at least one memory including computer program code for one or more programs, the at least one memory and the computer program code configured to, with the at least one processor, cause the apparatus to perform at least the following, process and/or facilitate a processing of contextual data associated with at least one vehicle against one or more safety criteria, one or more vehicle-related regulations, or a combination thereof to determine one or more dangerous or illegal activities, one or more people in the at least one vehicle, or a combination thereof associated with performing at least one maneuver using the at least one vehicle, the contextual data including one or more legal regulations; and at least one of:

disable the at least one vehicle's entertainment system, one or more calling capabilities, or a combination thereof, without user intervention, transmit data of the one or more dangerous or illegal activities to one or more authorities, to one or more insurance entities associated with the at least one vehicle, to the one or more people, or a combination thereof, to one or more family members of the one or more people, or a combination thereof, without user intervention, and present impact of the one or more dangerous or illegal activities on the at least one vehicle.

12. An apparatus of claim 11, wherein the apparatus is further caused to:

process and/or facilitate a processing of the contextual data to determine feasibility information associated with performing the at least one maneuver;

determine one or more user interface elements for presenting guidance information for the at least one maneuver based, at least in part, on the feasibility information; and wherein the presentation of the guidance information includes, at least in part, road geometry data, speed limit information, lane boundary information, one or more turn restrictions, or a combination thereof.

13. An apparatus of claim 12, wherein the apparatus is further caused to:

process and/or facilitate a processing of the contextual data to determine behavior information for at least one operator of the at least one vehicle, wherein the determination of the feasibility information, the determination of the one or more user interface elements, or a combination thereof is further based, at least in part, on the behavior information; and wherein the one or more user interface elements are for presenting the behavior information.

14. An apparatus of claim 13, wherein the apparatus is further caused to:

cause, at least in part, at least one modification of the one or more display devices, at least one transmission of the contextual data to one or more third parties, or a combination thereof based, at least in part, on the behavior information.

15. An apparatus of claim 12, wherein the one or more user interface elements include one or more rendering characteristics, one or more display devices, or a combination thereof.

16. An apparatus of claim 15, wherein the apparatus is further caused to:

determine the one or more rendering characteristics based, at least in part, on one or more color parameters, one or more display parameters, one or more media modes, or a combination thereof.

17. An apparatus of claim 15, wherein the one or more display devices include, at least in part, a user device display, a vehicle in-dash display, a vehicle heads-up display, or a combination thereof.

18. An apparatus of claim 12, wherein the apparatus is further caused to:
   process and/or facilitate a processing of the contextual data against one or more safety criteria, one or more vehicle-related regulations, or a combination thereof to determine the feasibility information.

19. An apparatus of claim 12, wherein the apparatus is further caused to:
   determine the contextual data, the feasibility information, the one or more user interface elements, or a combination thereof in substantially real-time, periodically, according to a schedule, on demand, or a combination thereof.

20. An apparatus of claim 12, wherein the apparatus is further caused to:
   process and/or facilitate a processing of sensor information associated with the at least one vehicle, the one or more display devices, or a combination thereof to determine, at least in part, a position, a direction, a speed, or a combination thereof associated with the at least one vehicle,
   wherein the contextual data is based, at least in part, on the position, the direction, the speed, or a combination thereof.

* * * * *